(12) United States Patent
Ismail et al.

(10) Patent No.: US 10,138,802 B2
(45) Date of Patent: Nov. 27, 2018

(54) POSITION CONTROL OF FLOW CONTROL VALVES NEAR ENDSTOPS

(71) Applicants: Ayman Ismail, Westland, MI (US); Brian Rockwell, Auburn Hills, MI (US); John R Bucknell, Royal Oak, MI (US); Ethan E Bayer, Lake Orion, MI (US)

(72) Inventors: Ayman Ismail, Westland, MI (US); Brian Rockwell, Auburn Hills, MI (US); John R Bucknell, Royal Oak, MI (US); Ethan E Bayer, Lake Orion, MI (US)

( * ) Notice: Subject to any disclaimer, the term of this patent is extended or adjusted under 35 U.S.C. 154(b) by 776 days.

(21) Appl. No.: 14/686,278

(22) Filed: Apr. 14, 2015

(65) Prior Publication Data

US 2016/0305312 A1   Oct. 20, 2016

(51) Int. Cl.
| | |
|---|---|
| F02D 23/00 | (2006.01) |
| F02B 33/44 | (2006.01) |
| F02B 37/18 | (2006.01) |
| F02D 41/00 | (2006.01) |
| F02D 41/24 | (2006.01) |
| F02D 41/14 | (2006.01) |
| F02D 41/20 | (2006.01) |

(52) U.S. Cl.
CPC ........ *F02B 37/183* (2013.01); *F02D 41/0007* (2013.01); *F02D 41/2464* (2013.01); *F02D 2041/141* (2013.01); *F02D 2041/2027* (2013.01); *F02D 2250/16* (2013.01); *Y02T 10/144* (2013.01)

(58) Field of Classification Search
CPC ....................................... F02B 38/183–38/186
USPC ............................................................ 60/602
See application file for complete search history.

(56) References Cited

U.S. PATENT DOCUMENTS

| | | | |
|---|---|---|---|
| 7,474,954 B1 | 1/2009 | Zagone | |
| 7,725,238 B2 | 5/2010 | Perkins | |
| 9,316,147 B2* | 4/2016 | Wang | ................... F02B 37/186 |
| 2013/0008417 A1 | 1/2013 | Sankar et al. | |
| 2014/0338307 A1 | 11/2014 | Kokotovic et al. | |
| 2015/0160661 A1* | 6/2015 | Avian | ................... F02B 37/186 |
| | | | 700/289 |

* cited by examiner

*Primary Examiner* — Ngoc T Nguyen
(74) *Attorney, Agent, or Firm* — Ralph E. Smith

(57) ABSTRACT

Techniques for learning endstop position(s) of an actuator for a wastegate valve include detecting a learn condition and, in response to detecting the learn condition, performing a learn procedure for the actuator endstop position(s). The learn procedure includes commanding the actuator to a desired position past the endstop position corresponding to a fully-closed wastegate valve while rate-limiting a velocity of the actuator. When the difference reaches its maximum allowed value and the velocity falls below a fraction of its rate limit, the endstop position is learned. When the wastegate valve is requested open, the actuator is then controlled using the learned endstop position. Reference stiffness for a fully-closed wastegate valve could be obtained, and subsequent stiffness checks could then be periodically performed and, if less than the reference stiffness, a duty cycle of the actuator could be increased during open-loop control.

16 Claims, 3 Drawing Sheets

POSITION CONTROL OF FLOW CONTROL VALVES NEAR ENDSTOPS

FIELD

The present application relates generally to flow control valve systems and, more particularly, to position control of flow control valves near endstops.

BACKGROUND

Vehicles often include flow control valves that control a flow of air through a passage. Examples of flow control valves include a throttle valve, an exhaust gas recirculation valve, and a wastegate valve. Each of these flow control valves is typically controlled by an actuator that has two endstop positions corresponding to a fully-open and fully-closed position of the flow control valve. These endstop positions are learned in order to accurately control the respective flow control valve via the actuator. Certain operating conditions, such as high operating temperatures, however, could affect the behavior of the flow control valve system. Therefore, actual valve flow area could be different than that indicated by their expected (sensed) position. Thus, while such flow control valve systems work for their intended purpose, there remains a need for improvement in the relevant art.

SUMMARY

In accordance with an aspect of the invention, a system for controlling wastegate valve flow area in a turbocharger of an engine is provided. In one exemplary implementation, the system includes a wastegate valve arranged between a housing of the turbocharger and a downstream portion of an exhaust system of the engine, an actuator coupled to the wastegate valve and operable to move between endstop positions corresponding to the wastegate valve being fully-open and fully-closed, the actuator configured to operate at a duty cycle corresponding to opening and closing of the wastegate valve, and a controller configured to: detect a learn condition for performing a learn of the endstop position of the actuator corresponding to the fully-closed wastegate valve, in response to detecting the learn condition, command the actuator to a desired position past the endstop position corresponding to the fully-closed wastegate valve while rate-limiting a velocity of the actuator, learn the endstop position corresponding to the fully-closed wastegate valve when (i) the difference between the commanded and sensed positions reaches a maximum allowed difference and (ii) the velocity decreases below a fraction of the rate limit to obtain a learned endstop position, and control the actuator using the learned endstop position in response to a subsequent request to open the wastegate valve. In one exemplary implementation, the learn condition is that the wastegate valve has been requested to fully close.

In accordance with an aspect of the invention, a method for controlling wastegate valve flow area in a turbocharger of an engine is provided. In one exemplary implementation, the method includes detecting, by a controller, a learn condition for performing a learn of an endstop position of an actuator corresponding to a fully-closed wastegate valve, the actuator being operable to move between the endstop position and another endstop position corresponding to a fully-open wastegate valve, the actuator being configured to operate at a duty cycle corresponding to opening and closing of the wastegate valve, in response to detecting the learn condition, commanding, by the controller, the actuator to a desired position past the endstop position corresponding to the fully-closed wastegate valve while rate-limiting a velocity of the actuator, learning, by the controller, the endstop position corresponding to the fully-closed wastegate valve when (i) the difference between the commanded and sensed positions reaches a maximum allowed difference and (ii) the velocity decreases below a fraction of the rate limit to obtain a learned endstop position, and controlling, by the controller, the actuator using the learned endstop position to determine and control the wastegate valve to a relative valve opening angle in response to a subsequent request to open the wastegate valve. In one exemplary implementation, the learn condition is that the wastegate valve has been requested fully closed.

In some implementations, a learned endstop position will also be obtained when (i) the wastegate valve has not been requested to the fully closed position, but the duty cycle of the actuator has exceeded a threshold determined based on a pressure difference across the wastegate valve and (ii) the wastegate valve is operating near the previously learned endstop position. In one exemplary implementation, the controller is configured to detect a supporting learn condition including (i) a duty cycle of the actuator exceeding a threshold determined based on a pressure difference across the wastegate valve when (ii) operating near a previously learned endstop position, in response to detecting the supporting learn condition, determine whether the learned endstop position remains accurate, and relearn the endstop position when the learned endstop position is no longer accurate In some implementations, in response to obtaining the learned endstop position, the controller: increases the duty cycle of the actuator, after increasing the duty cycle of the actuator, obtains a first measured endstop position, and in response to obtaining the first measured endstop position, decreases the duty cycle of the actuator. In some implementations, the controller calculates a reference stiffness of the wastegate valve assembly (i.e., the wastegate valve and the actuator) in the fully closed position based on a difference between the learned and first measured endstop positions.

In some implementations, the technique further includes, in response to obtaining the learned endstop position, transitioning from closed-loop control to open-loop control of the actuator. In some implementations, the open-loop control of the wastegate valve includes freezing proportional and integral terms of a control scheme used during the closed-loop control of the actuator. In some implementations, the open-loop control of the wastegate valve includes modulating a duty cycle of the actuator based on a pressure difference across the wastegate valve.

In some implementations, modulating the duty cycle of the wastegate valve includes: obtaining a second measured endstop position, increasing the duty cycle of the actuator, after increasing the duty cycle of the actuator, obtaining a third measured endstop position, decreasing the duty cycle of the actuator after obtaining the third measured endstop position. In some implementations, the controller calculates a stiffness of the wastegate valve based on a difference between the second and third measured endstop positions, and increases the duty cycle of the actuator when the calculated stiffness is less than the reference stiffness of the wastegate valve to ensure that the wastegate valve remains firmly closed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
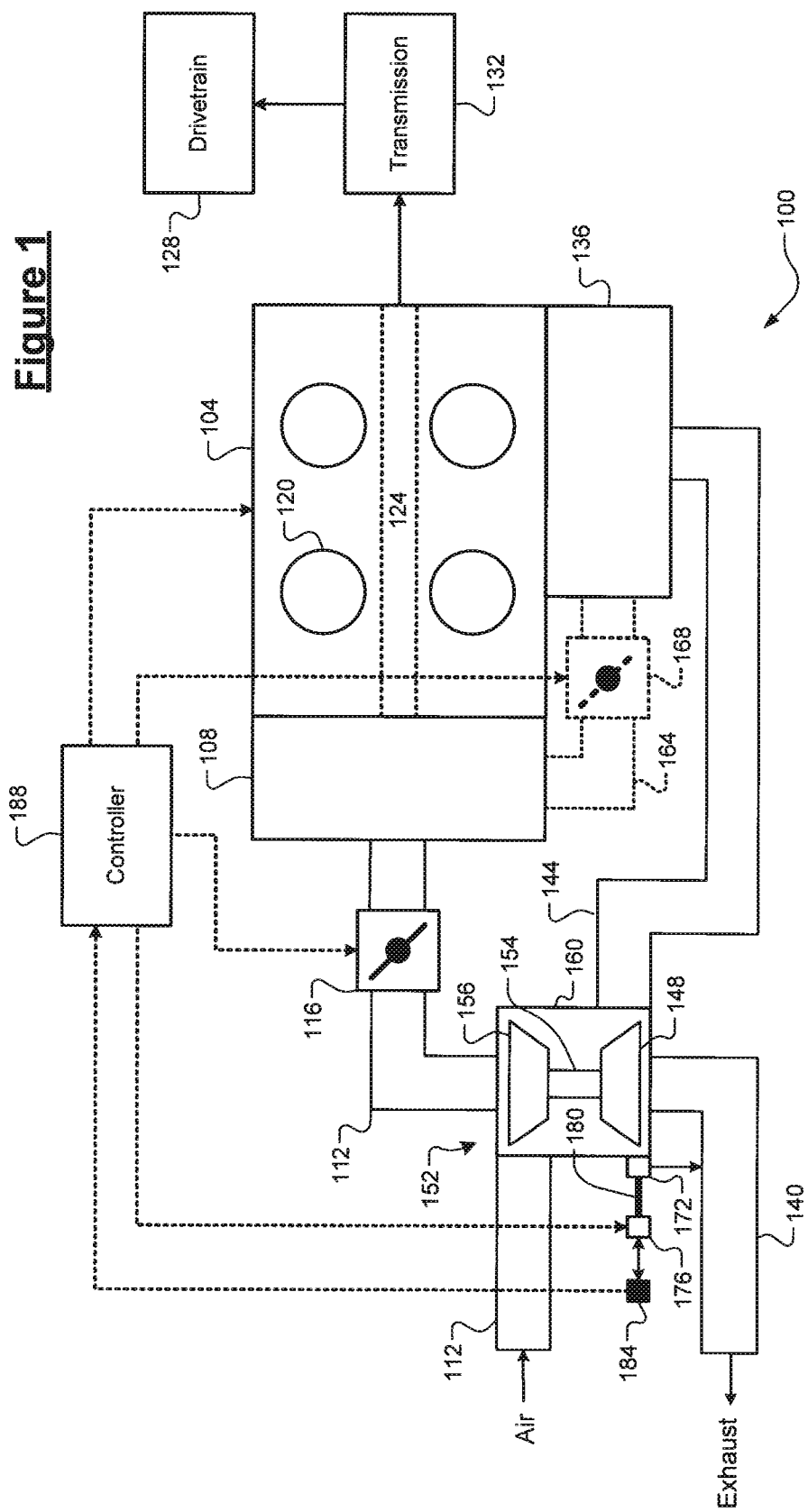
FIG. 1 is an example diagram of an engine system according to the principles of the present disclosure.

As previously discussed, certain operating conditions, such as high operating temperatures, could affect the behavior of a flow control valve system having an actuator configured to control a flow control valve, which could cause inaccurate control of the flow control valve. Wastegate valves, for example, operate in high temperature environments proximate one or more turbochargers and other exhaust gas-related components. Thus, wastegate valves are typically controlled by the actuator via a linkage, such as a control arm. This linkage, however, is also susceptible to the high temperatures, which could cause the actuator to not fully close the wastegate valve when desired due to thermal expansion/contraction. As a result, the turbocharger could be prevented from achieving its maximum boost pressure or precisely controlling wastegate valve flow area, which could result in decreased performance and/or efficiency. Moreover, these temperatures vary during operation, and thus the actual endstop positions could vary during operation.

Accordingly, techniques are presented for learning the actuator endstop positions corresponding to a fully-closed and fully-open wastegate valve. In response to detecting a learn condition, the techniques involve performing a learn procedure for the actuator endstop position. In one exemplary implementation, the learn condition is when the wastegate valve is being requested to fully close. The learn condition could be based on specific operating conditions during which the learn procedure would not affect or be intrusive to a driver's operation. Specific examples of this learn condition include a deceleration fuel cut-off (DFCO) event and immediately after engine start or immediately before engine stop. In one exemplary implementation, another learn condition includes a duty cycle of the actuator exceeding a threshold determined based on a pressure difference across the wastegate valve. In this exemplary implementation, a supporting learn procedure occurs when operating near a previously learned endstop position and the duty cycle exceeds the threshold. This supporting learn procedure can be used to detect when a previously learned endstop position is no longer accurate and the wastegate valve has been inadvertently requested beyond the actual closed position.

The learn procedure includes, in one exemplary implementation, commanding the actuator to a position past a fully-closed position of the wastegate at a rate-limited velocity. The desired position for the actuator could lead the actual/sensed position by a specific lead amount to ensure full closure of the wastegate valve. The endstop position corresponding to the fully-closed wastegate valve is learned and stored in memory when a velocity of the actuator decreases below a fraction of the rate limited difference to obtain a learned endstop position. The actuator is then transitioned to open-loop control to hold the wastegate valve closed. Upon a request to open the wastegate valve, the actuator is then operated using the learned endstop position to determine and control the wastegate valve to a precise valve flow area. In one exemplary implementation, after the learn procedure occurs, the duty cycle of the actuator is then temporarily increased and a first measured endstop position is obtained. A calculated difference between the learned and measured endstop positions represents a stiffness reference.

The term "stiffness" as used herein corresponds to a reluctance or opposition of the wastegate valve to close due to seating force of the wastegate valve against the turbocharger housing (e.g., against its valve seat) when fully closed and sealed. The reference stiffness could be calculated immediately after the learning of the learned endstop position. The seal by the wastegate valve could then be subsequently checked or verified by calculating a stiffness of the wastegate valve assembly (e.g., a difference between the measured endstop positions before/after ramping up the duty cycle). For example, this check could be performed periodically during operation. When the calculated wastegate valve stiffness is less than the reference stiffness, the duty cycle of the actuator could be increased to compensate.

While the techniques of the present disclosure are discussed with particular reference to wastegate valves, it will be appreciated that these techniques could be similarly applied to other airflow control valves. Non-limiting examples include an exhaust gas recirculation (EGR) valve and a throttle valve. The EGR valve, for example, also operates in a high temperature environment and thus could be similarly susceptible to inaccurate control by a corresponding actuator. It will be appreciated, however, that the techniques as applied to other airflow control valves could differ from the techniques discussed herein due to the differing system conditions (different temperatures, different pressures, etc.). It will be further appreciated that these techniques could be applied to fluid flow control valves and, more particularly, fluid flow control valves in high temperature and/or pressure environments.

Referring now to FIG. 1, an example diagram of an engine system 100 is illustrated. The engine system 100 includes an engine 104 (gasoline, diesel, homogeneous charge compression ignition (HCCI), etc.) configured to combust an air/fuel mixture to generate drive torque. The engine 104 draws air into an intake manifold 108 through an induction system 112 that is regulated by a throttle valve 116. The air in the intake manifold 108 is distributed to a plurality of cylinders 120 and combined with fuel (port fuel injection, direct injection, etc.) to create the air/fuel mixture. While four cylinders are shown, it will be appreciated that the engine 104 could include other numbers of cylinders. The air/fuel mixture is compressed by pistons (not shown) within the cylinders 120 and combusted to drive the pistons, which rotatably turn a crankshaft 124 and generate drive torque. The drive torque is then transferred from the crankshaft 124 to a drivetrain 128 by a transmission 132.

Exhaust gas resulting from combustion is expelled from the cylinders 120 into an exhaust manifold 136. An exhaust system 140 is configured to treat at least a portion of the exhaust gas before it is released into the environment. A turbocharger exhaust pipe 144 is configured to recirculate at least a portion of the exhaust gas in the exhaust manifold 136 to power a turbine 148 of a turbocharger 152. While a single turbocharger 152 is illustrated, it will be appreciated that the engine 104 could include two or more turbochargers. The pressure of the exhaust gas within a housing 160 of the turbocharger 152 ("back pressure") causes the turbine 148 to spin, which in turn via a coupled shaft 154 causes a compressor 156 of the turbocharger 152 to spin and thereby force compressed air into the induction system 112. An optional EGR exhaust pipe 164 is also configured to recirculate at least a portion of the exhaust gas to the intake manifold 108 as regulated by an optional EGR valve 168.

A wastegate valve 172 is arranged between a housing 160 and a downstream portion of the exhaust system 140. Examples of the wastegate valve 172 include, but are not limited to, a poppet valve and a butterfly valve. The wastegate valve 172 is actuated by an actuator 176 via a linkage 180, such as a control arm. Opening the wastegate valve 176 diverts exhaust gas away from the turbine 148, which decreases back pressure and in turn regulates rotation of the compressor 156. A position sensor 184 is configured to measure a position of the actuator 176. The wastegate valve 172, the actuator 176, the linkage 180, and the position sensor 184 are collectively referred to as a wastegate valve system. A controller 188 is configured to control operation of the engine system 100. This control includes, but is not limited to, closed-loop control of the actuator 176 based on feedback from the position sensor 184 and the learned endstop position of the actuator 176 and open-loop control of the actuator 176 to maintain the wastegate valve 172 fully closed, both of which are described in greater detail below.

Figure 2:
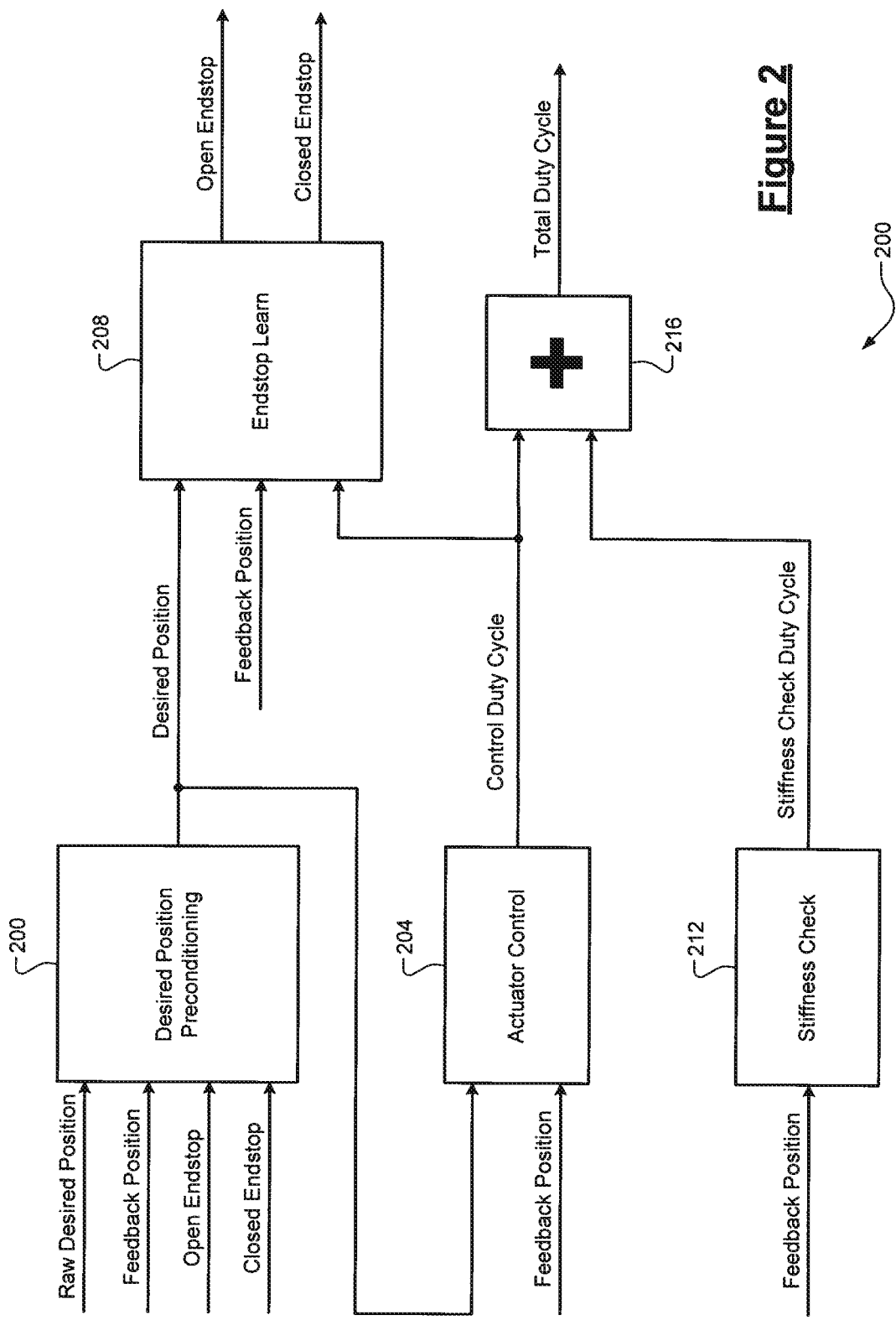
FIG. 2 is an example functional block diagram of a control architecture for a wastegate valve system according to the principles of the present disclosure.

Referring now to FIG. 2, an example functional block diagram of control architecture 200 for the wastegate valve system is illustrated. In one exemplary implementation, the control architecture 200 is implemented by the controller 188. The control architecture 200 includes a desired positioning preconditioning block 200, an actuator control block 204, an endstop learn block 208, a stiffness check block 212, and a duty cycle adjustment block 216. The desired position preconditioning block 208 receives a raw desired position (e.g., a maximum position), a feedback position from the position sensor 184, and previously-learned open and closed endstop positions. For example, these previously-learned open and closed endstop positions could be retrieved from a memory of the controller 188.

The desired position preconditioning block 200 limits the desired position such that the desired position only leads the feedback position by a predetermined position difference. This lead ensures that contact has been made with the endstop (otherwise the steady-state error would not be present) and ensures a repeatable loading against the endstop (e.g., a sealing force). The change in the desired position can be rate-limited to ensure that a velocity of the actuator 176 is limited by the actuator control block 204 to prevent the wastegate valve 172 from having a hard impact with the housing 160 of the turbocharger 152, which could potentially cause damage to the wastegate valve 172 and/or the turbocharger 152. In other words, this control provides for a soft closure of the wastegate valve 172 while performing the learn procedure. The actuator control block 204 controls the actuator 172 by generating a control duty cycle for the actuator 172 based on the rate-limited desired position and the feedback position.

The endstop learn block 208 monitors the rate-limited desired position, the feedback position, and the rate-limited velocity (corresponding to the control duty cycle). When both (i) the difference between the desired and feedback positions reaches a maximum allowed position difference and (ii) the velocity decreases below a threshold that is a fraction of the rate-limit, the endstop learn block 208 learns the corresponding endstop position. This threshold could be calibratable based on parameters of the wastegate valve system. The same procedure could then be repeated to learn the other endstop position.

Following the first endstop position learn, however, a first measured endstop position could be obtained after increasing the control duty cycle of the actuator 176 in order to obtain a reference stiffness of the wastegate valve 172. The stiffness check block 212 uses the feedback position and the learned endstop position to calculate a stiffness of the wastegate valve 172. The stiffness check block 212 then compares subsequent calculated stiffnesses (i.e., measured endstop positions before/after ramping up the duty cycle) during open-loop control to the reference stiffness. When the calculated stiffness is less than the reference stiffness, a total duty cycle of the actuator 172 is increased. More particularly, the stiffness check block 212 outputs a stiffness check duty cycle, which is then summed with the control duty cycle by the duty cycle adjustment block 216 to obtain the total duty cycle. The learned endstop positions (closed-loop control to a desired flow area, e.g., upon a subsequent request to open the wastegate valve 172) and/or the total duty cycle (open-loop control) can be used to control the actuator 172.

As previously discussed, once the endstop position learn (s) are complete, the system switches from closed-loop control to open-loop control. In other words, this open-loop control could be performed when the wastegate valve 172 is fully closed. In one exemplary implementation, the system freezes proportional (P) and integral (I) terms of a PI or a proportional-integral-derivative (PID) control scheme utilized during closed-loop control. During open-loop control, the duty cycle is modulated based on a pressure difference across the wastegate valve 172. The upstream/downstream exhaust pressures across the wastegate valve 172 could be modeled or directly measured. This open-loop control could be superior to closed-loop control because the position of the endstop could move up to several degrees due to thermal expansion of the housing 160 and thus the desired position for closed-loop position control is not accurately known; however, the duty cycle required to hold the wastegate valve 172 closed could be accurately predicted based on the pressure difference across it.

Figure 3:
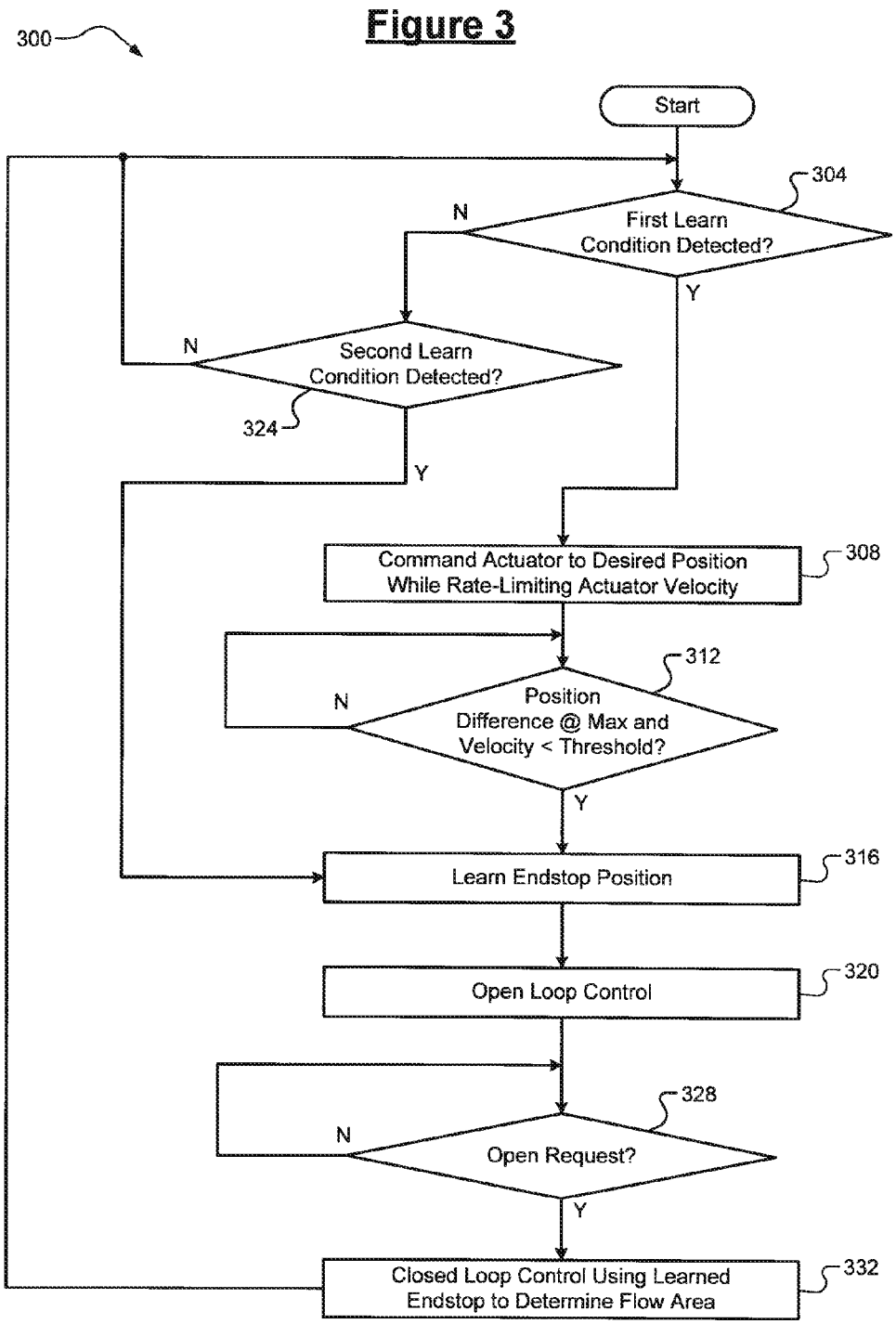
FIG. 3 is an example flow diagram of a method for wastegate valve system control according to the principles of the present disclosure.

Referring now to FIG. 3, an example flow diagram of a method 300 for learning the wastegate closed endstop position and controlling the wastegate valve 172 to a desired flow area are illustrated. At 304, the controller 188 detects a learn condition Indicative of a request to fully close the wastegate valve 172 ("first learn condition"). Specific examples of this learn condition include a deceleration fuel cut-off (DFCO) event and immediately after engine start or immediately before engine stop. When the learn condition is detected, the method 300 proceeds to 308. When the learn condition is not detected, the method 300 optionally proceeds to 324. It will be appreciated, however, that when the learn condition is not detected, the method 300 could end or return to 304.

At 324, the controller 188 determines whether (i) a duty cycle of the actuator 176 exceeds a threshold determined based on a pressure difference across the wastegate valve 172 when (ii) operating near a previously learned endstop position ("second or supporting learn condition"). If true, the method 300 proceeds to 316. If false, the method 300 ends or returns to 304. At 308, the controller 188 commands the actuator 176 to a desired position past the endstop position corresponding to a fully-closed wastegate valve 172 while rate-limiting the velocity of the actuator 176. At 312, the controller 188 detects whether (i) the position difference between the commanded and a measured or senses position has reached a maximum allowable difference and (ii) the velocity has decreased below a threshold that is a fraction of the rate limit.

When both of these constraints are true, the method 300 proceeds to 316 where the endstop position is learned. When one or both of these constraints are false, however, the method 300 returns to 312. At 320, the controller 188 controls the actuator 176 using open-loop control. The learned endstop position could then be used to control the actuator 176 when the wastegate valve 172 is reopened, e.g., in order to determine its relative opening angle. At 328, the controller 188 determines whether the wastegate valve 172 is requested open. If true, the method 300 proceeds to 332. If false, the method 300 ends or returns to 328. At 332, the controller 188 transitions to closed-loop control using the learned endstop position to determine the wastegate valve flow area.

The method 300 then ends or returns to 304 for one or more additional cycles (e.g., to learn the other endstop position corresponding to a fully-opened wastegate valve 172). In some implementations, the method 300 could further comprise the subsequent learning of the reference stiffness, the stiffness check, and the duty cycle adjustment based on the stiffness check as previously discussed herein.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method of controlling wastegate valve flow area in a turbocharger of an engine, the method comprising:
    receiving, by a controller, a request to fully close a wastegate valve, the wastegate valve being actuated by an actuator that is operable to move between endstop positions corresponding to the wastegate valve being fully-open and fully-closed, the actuator being configured to operate at a duty cycle corresponding to opening and closing of the wastegate valve;
    in response to receiving the request to fully close the wastegate valve, commanding, by the controller, the actuator to a desired position past the endstop position corresponding to the fully-closed wastegate valve while rate-limiting a velocity of the actuator;
    obtaining, by the controller, a learned endstop position corresponding to the fully-closed wastegate valve when (I) a difference between the commanded position and a sensed position reaches a threshold difference and (ii) the velocity decreases below the rate limit to obtain the learned endstop position;
    receiving, by the controller, a request to open the wastegate valve; and
    in response to receiving the request to open the wastegate valve, controlling, by the controller, the actuator based on the learned endstop position.

2. The method of claim 1, further comprising in response to obtaining the learned endstop position:
    increasing, by the controller, the duty cycle of the actuator;
    after increasing the duty cycle of the actuator, obtaining, by the controller, a first measured endstop position;
    in response to obtaining the first measured endstop position, decreasing, by the controller, the duty cycle of the actuator; and
    calculating, by the controller, a reference stiffness of the wastegate valve based on a difference between the learned and first measured endstop positions.

3. The method of claim 2, further comprising transitioning, by the controller, from (i) a proportional-integral (PI) or proportional-integral-derivative (PID) closed-loop control scheme for the actuator prior to obtaining the learned endstop position, the PI or PID closed-loop control scheme having at least proportional and integral terms, to (ii) an open-loop control for the actuator after obtaining the learned endstop position.

4. The method of claim 3, further comprising maintaining, by the controller, the proportional and integral terms of the PI or PID closed-loop control scheme for the actuator constant while performing the open-loop control scheme for the actuator.

5. The method of claim 3, wherein the open-loop control scheme for the actuator includes modulating a duty cycle of the actuator based on a pressure difference across the wastegate valve.

6. The method of claim 3, wherein modulating the duty cycle of the wastegate valve includes:
    obtaining a second measured endstop position;
    increasing the duty cycle of the actuator;
    after increasing the duty cycle of the actuator, obtaining a third measured endstop position;
    in response to obtaining the third measured endstop position, decreasing the duty cycle of the actuator; and
    calculating a stiffness of the wastegate valve based on a difference between the second and third measured endstop positions.

7. The method of claim 6, further comprising increasing, by the controller, the duty cycle of the actuator when the calculated stiffness is less than the reference stiffness of the wastegate valve.

8. The method of claim 2, further comprising:
    detecting, by the controller, an update condition including (i) a duty cycle of the actuator exceeding a threshold determined based on a pressure difference across the wastegate valve when (ii) operating near the learned endstop position;
    in response to detecting the update condition, obtaining, by the controller, an updated endstop position corresponding to the fully-closed wastegate valve by:
        commanding the actuator to the desired position past the endstop position corresponding to the fully-closed wastegate valve while rate-limiting the velocity of the actuator, and
        obtaining the updated endstop position when (i) the difference between the commanded and sensed positions reaches the threshold difference and (ii) the velocity decreases below the rate limit to obtain the updated endstop position; and
    when a magnitude of a difference between the learned and updated endstop positions exceeds a threshold, controlling, by the controller, the actuator based on the updated endstop position instead of the learned endstop position.

9. A system for controlling wastegate valve flow area in a turbocharger of an engine, the system comprising:

a wastegate valve configured to divert exhaust gas produced by the engine away from a turbine of the turbocharger;
an actuator coupled to the wastegate valve and operable to move between endstop positions corresponding to the wastegate valve being fully-open and fully-closed, the actuator configured to operate at a duty cycle corresponding to opening and closing of the wastegate valve; and
a controller configured to:
 receive a request to fully close the wastegate valve;
 in response to receiving the request to fully close the wastegate valve, command the actuator to a desired position past an endstop position corresponding to the fully-closed wastegate valve while rate-limiting a velocity of the actuator,
 obtain a learned endstop position corresponding to the fully-closed wastegate valve when (i) a difference between the commanded position and a sensed position of the actuator reaches a threshold difference and (ii) the velocity decreases below the rate limit to obtain the learned endstop position;
 receive a request to open the wastegate valve; and
 in response to receiving the request to open the wastegate valve, control the actuator based on the learned endstop position.

10. The system of claim 9, wherein in response to obtaining the learned endstop position, the controller is further configured to:
 increase the duty cycle of the actuator;
 after increasing the duty cycle of the actuator, obtain a first measured endstop position;
 in response to obtaining the first measured endstop position, decreasing the duty cycle of the actuator; and
 calculating a reference stiffness of the wastegate valve based on a difference between the learned and first measured endstop positions.

11. The system of claim 10, wherein the controller is further configured to transition from (i) a proportional-integral (PI) or proportional-integral-derivative (PID) closed-loop control scheme for the actuator prior to obtaining the learned endstop position, the PI or PID closed-loop control scheme having at least proportional and integral terms, to (II) an open-loop control scheme for the actuator after obtaining the learned endstop position.

12. The system of claim 11, wherein the controller is configured to maintain the proportional and integral terms of the PI or PID closed-loop control scheme constant while performing the open-loop control scheme for the actuator.

13. The system of claim 11, wherein the open-loop control scheme for the actuator includes modulating a duty cycle of the actuator based on a pressure difference across the wastegate valve.

14. The system of claim 13, wherein modulating the duty cycle of the wastegate valve includes:
 obtaining a second measured endstop position;
 increasing the duty cycle of the actuator;
 after increasing the duty cycle of the actuator, obtaining a third measured endstop position;
 in response to obtaining the third measured endstop position, decreasing the duty cycle of the actuator; and
 calculating a stiffness of the wastegate valve based on a difference between the second and third measured endstop positions.

15. The system of claim 14, wherein the controller Is further configured to increase the duty cycle of the actuator when the calculated stiffness is less than the reference stiffness of the wastegate valve.

16. The system of claim 9, wherein the controller is further configured to:
 detect an update condition including (i) a duty cycle of the actuator exceeding a threshold determined based on a pressure difference across the wastegate valve when (ii) operating near the learned endstop position;
 in response to detecting the update condition, obtain an updated endstop position-corresponding to the fully-closed wastegate valve by:
  commanding the actuator to the desired position past the endstop position corresponding to the fully-closed wastegate valve while rate-limiting the velocity of the actuator, and
  obtaining the updated endstop position when (i) the difference between the commanded and sensed positions reaches the threshold difference and (ii) the velocity decreases below the rate limit to obtain the updated endstop position; and
 when a magnitude of a difference between the learned and updated endstop positions exceeds a threshold, control the actuator based on the updated endstop position instead of the learned endstop position.

* * * * *